March 30, 1943. B. E. LAWRENCE 2,315,018
JUICE EXTRACTOR AND MIXER
Filed Dec. 28, 1939 9 Sheets-Sheet 1
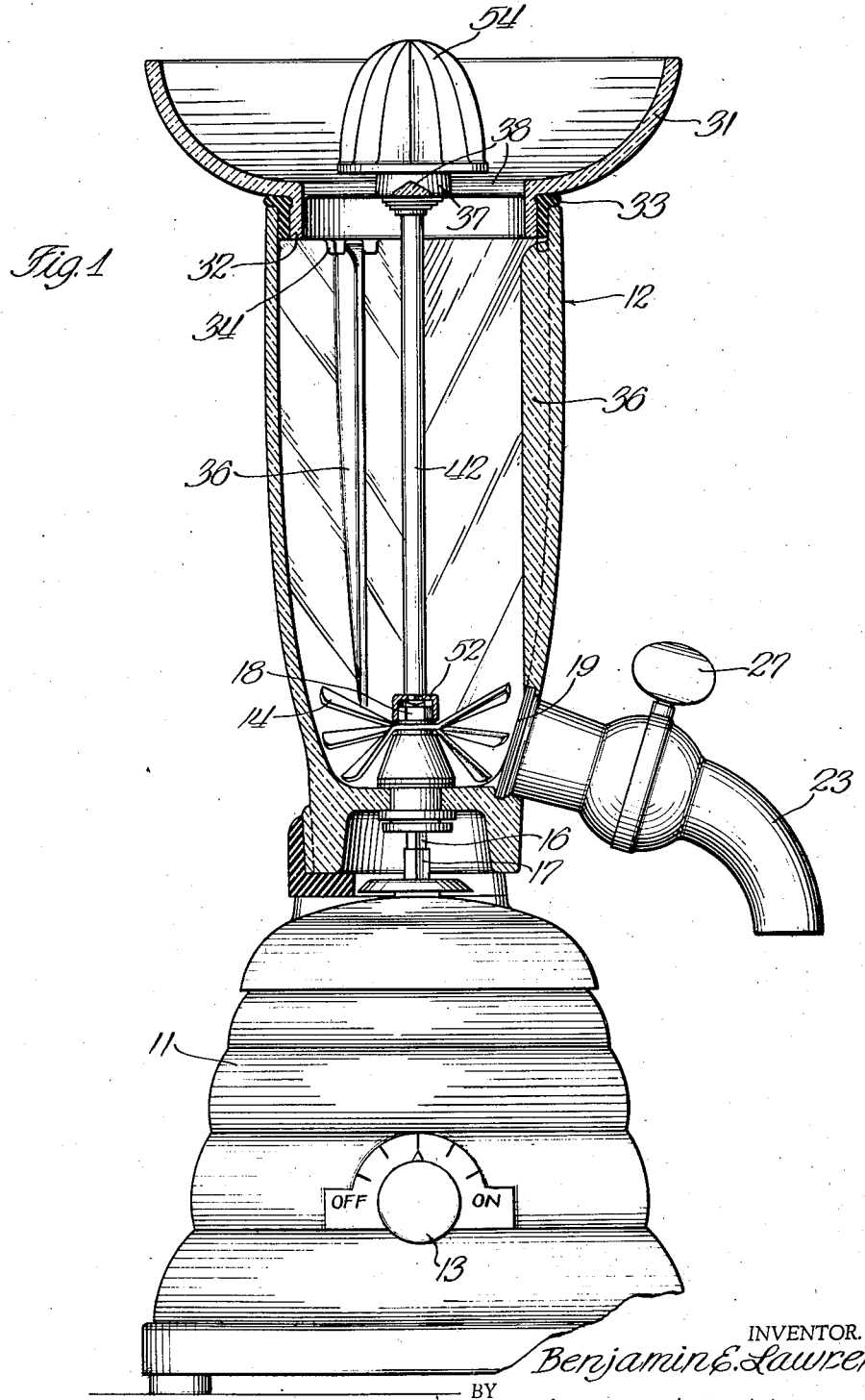
INVENTOR.
Benjamin E. Lawrence
BY McLaughlin & Wallenstein
ATTORNEYS March 30, 1943.　　　B. E. LAWRENCE　　　2,315,018
JUICE EXTRACTOR AND MIXER
Filed Dec. 28, 1939　　　9 Sheets-Sheet 2
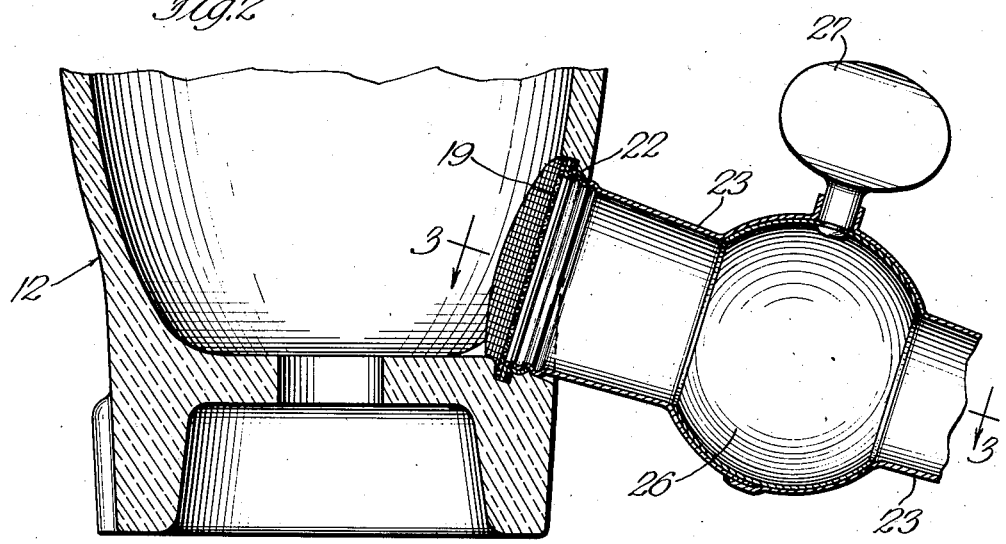
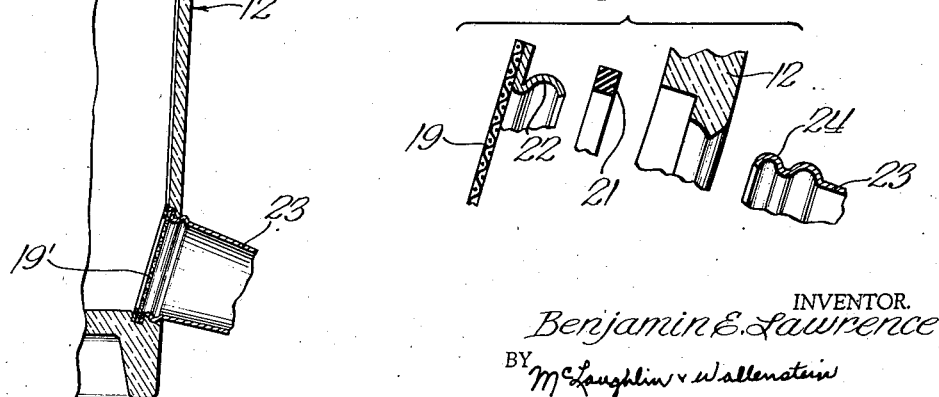
INVENTOR.
Benjamin E. Lawrence
BY McLaughlin & Wallenstein
ATTORNEYS March 30, 1943. B. E. LAWRENCE 2,315,018
JUICE EXTRACTOR AND MIXER
Filed Dec. 28, 1939 9 Sheets-Sheet 3
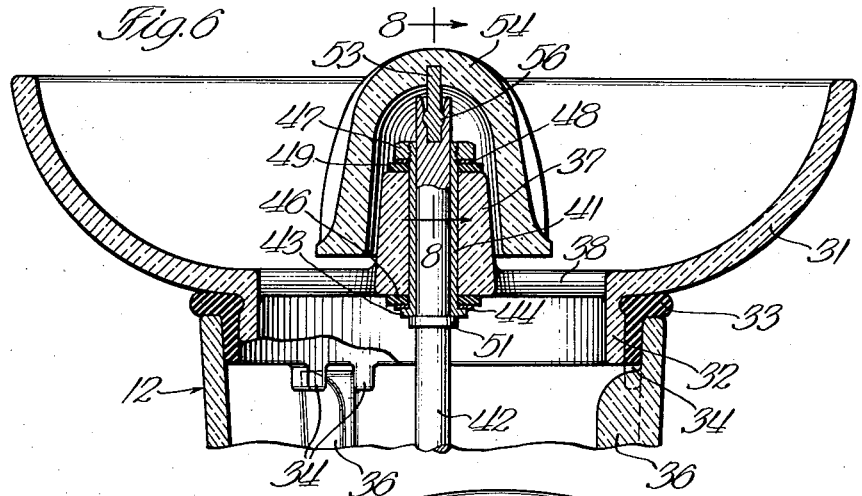
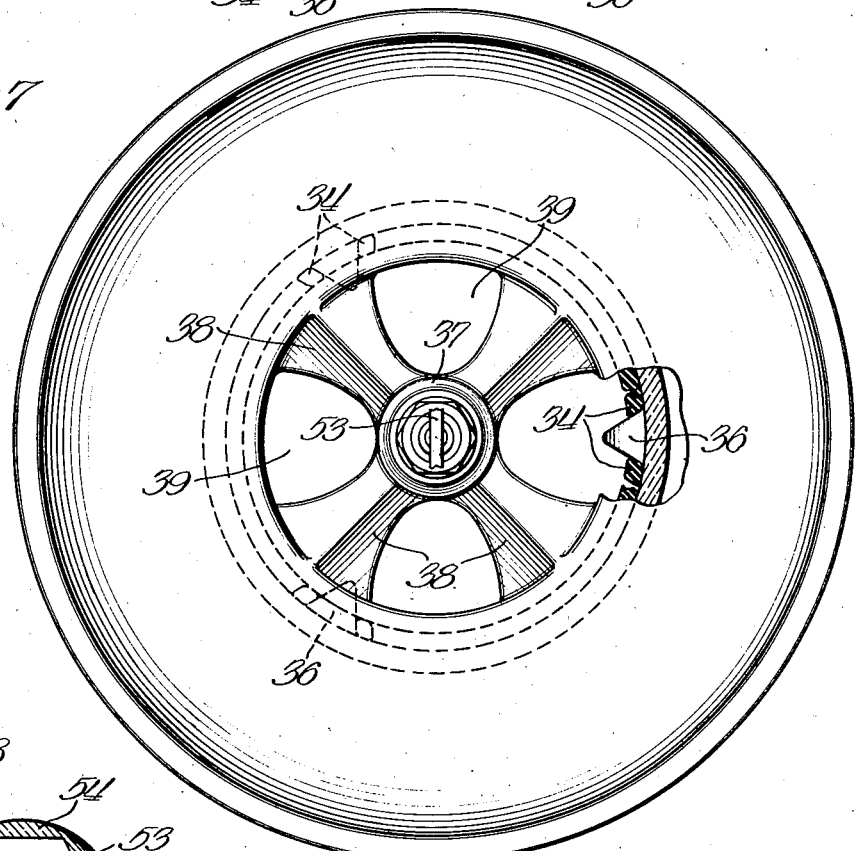
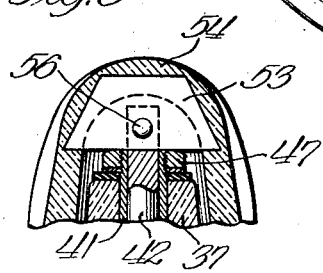
INVENTOR.
Benjamin E. Lawrence
BY McLaughlin & Wallenstein
ATTORNEYS March 30, 1943.  B. E. LAWRENCE  2,315,018

JUICE EXTRACTOR AND MIXER

Filed Dec. 28, 1939  9 Sheets-Sheet 4

INVENTOR.
Benjamin E. Lawrence
BY McLaughlin & Wallenstein
ATTORNEYS

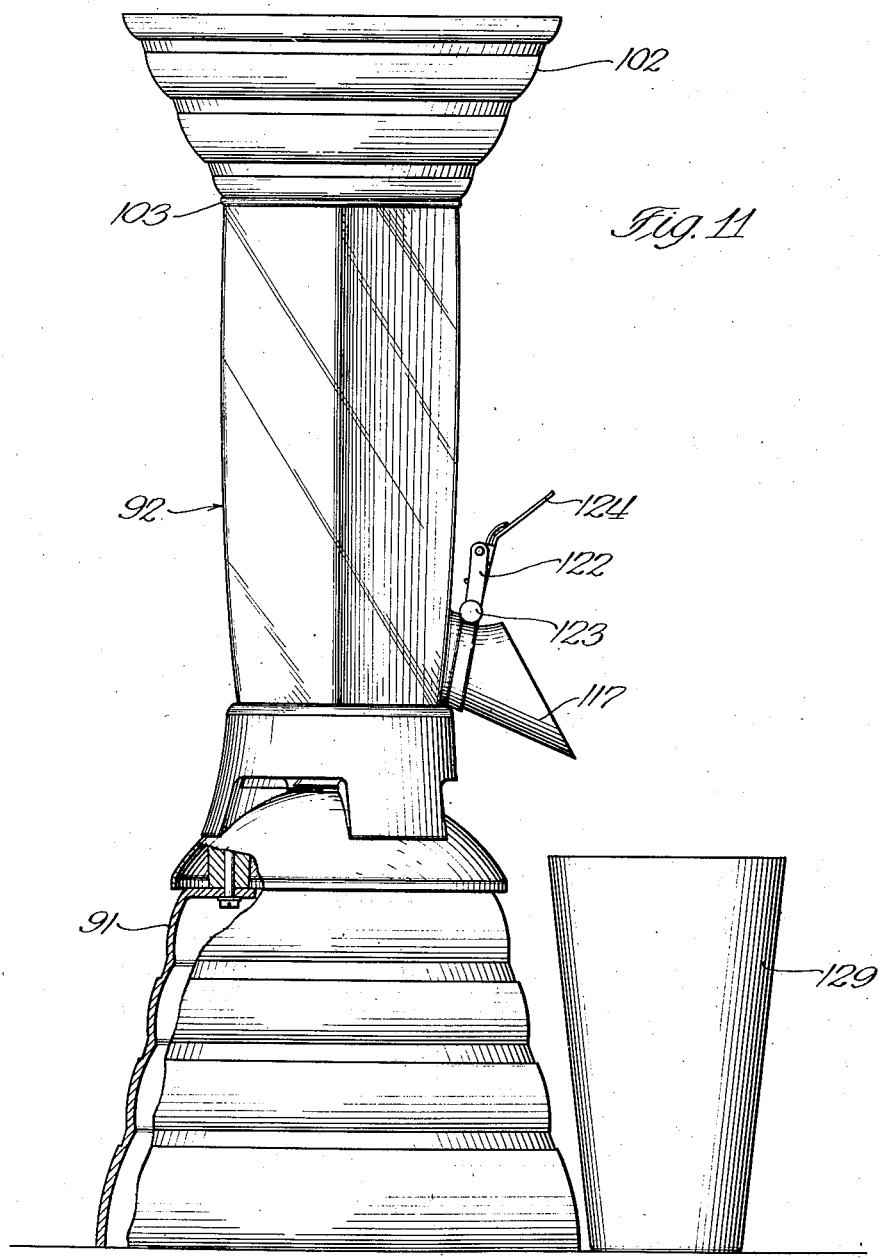

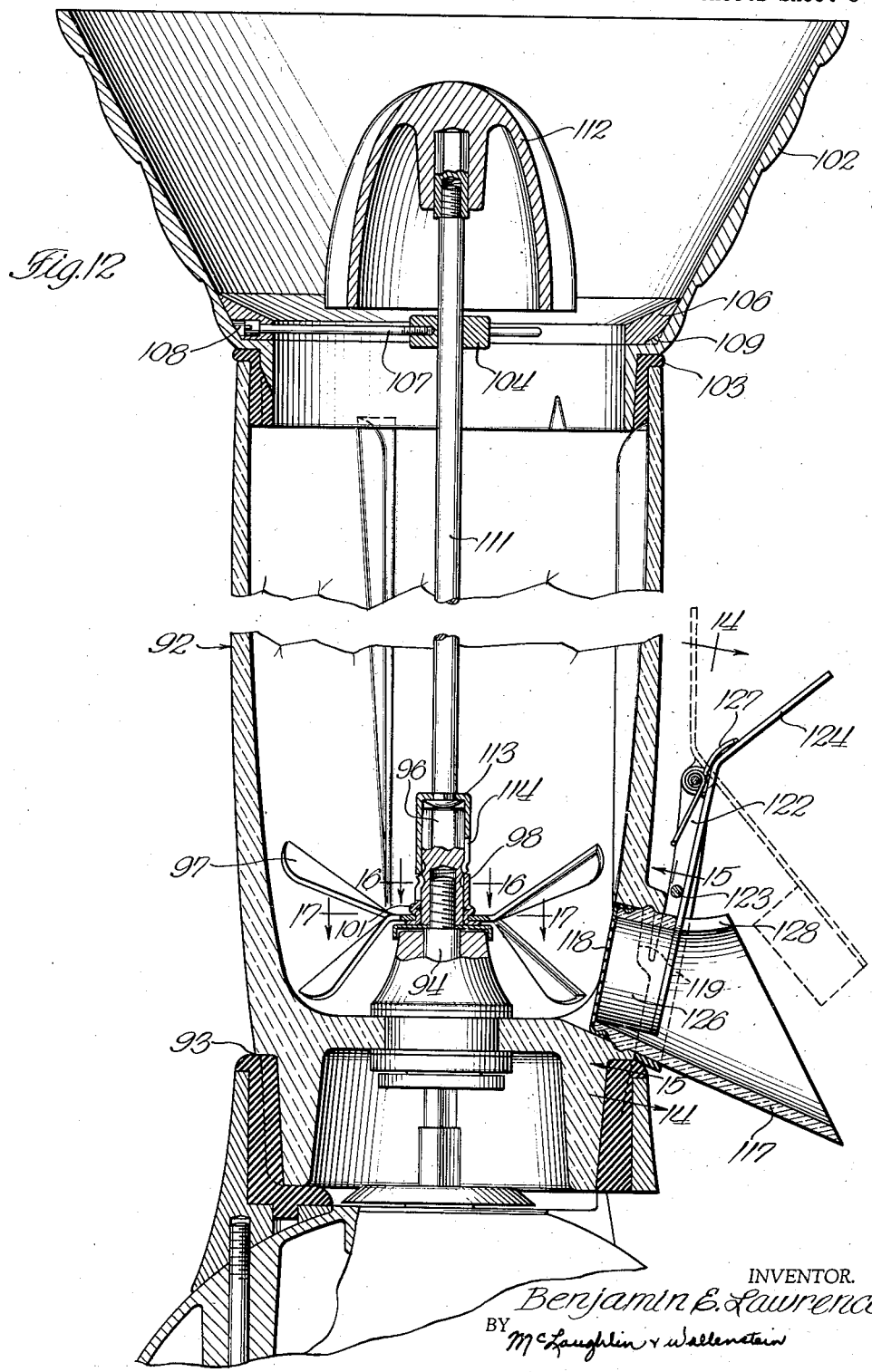

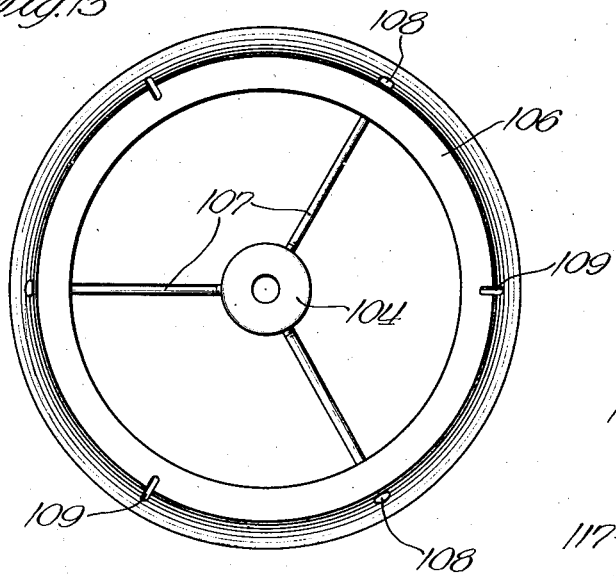
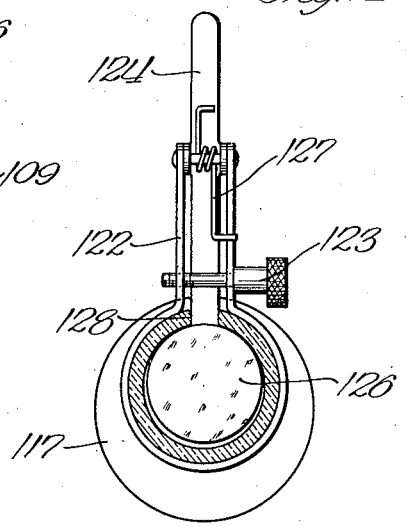
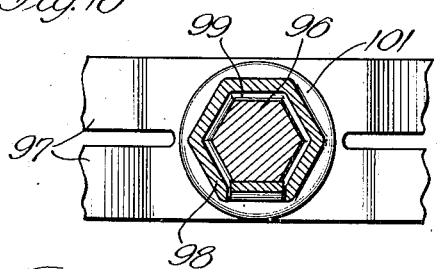
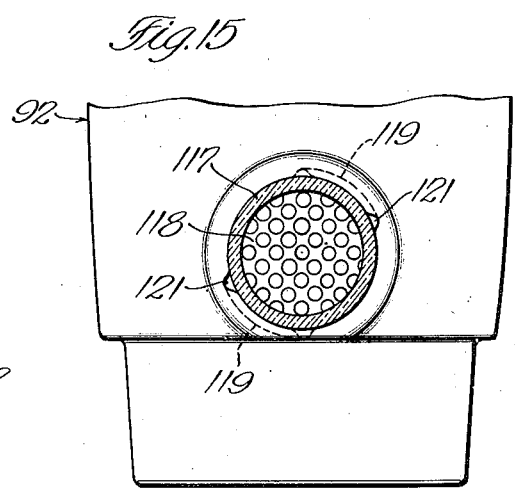
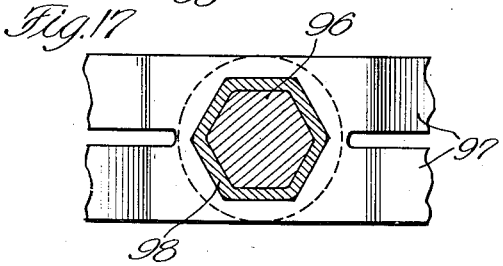
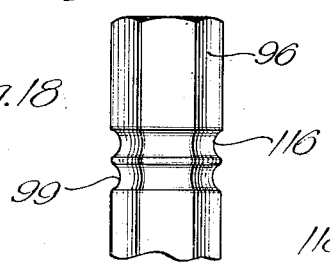
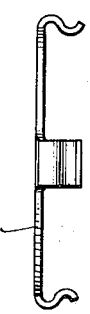

March 30, 1943.    B. E. LAWRENCE    2,315,018
JUICE EXTRACTOR AND MIXER
Filed Dec. 28, 1939    9 Sheets-Sheet 8
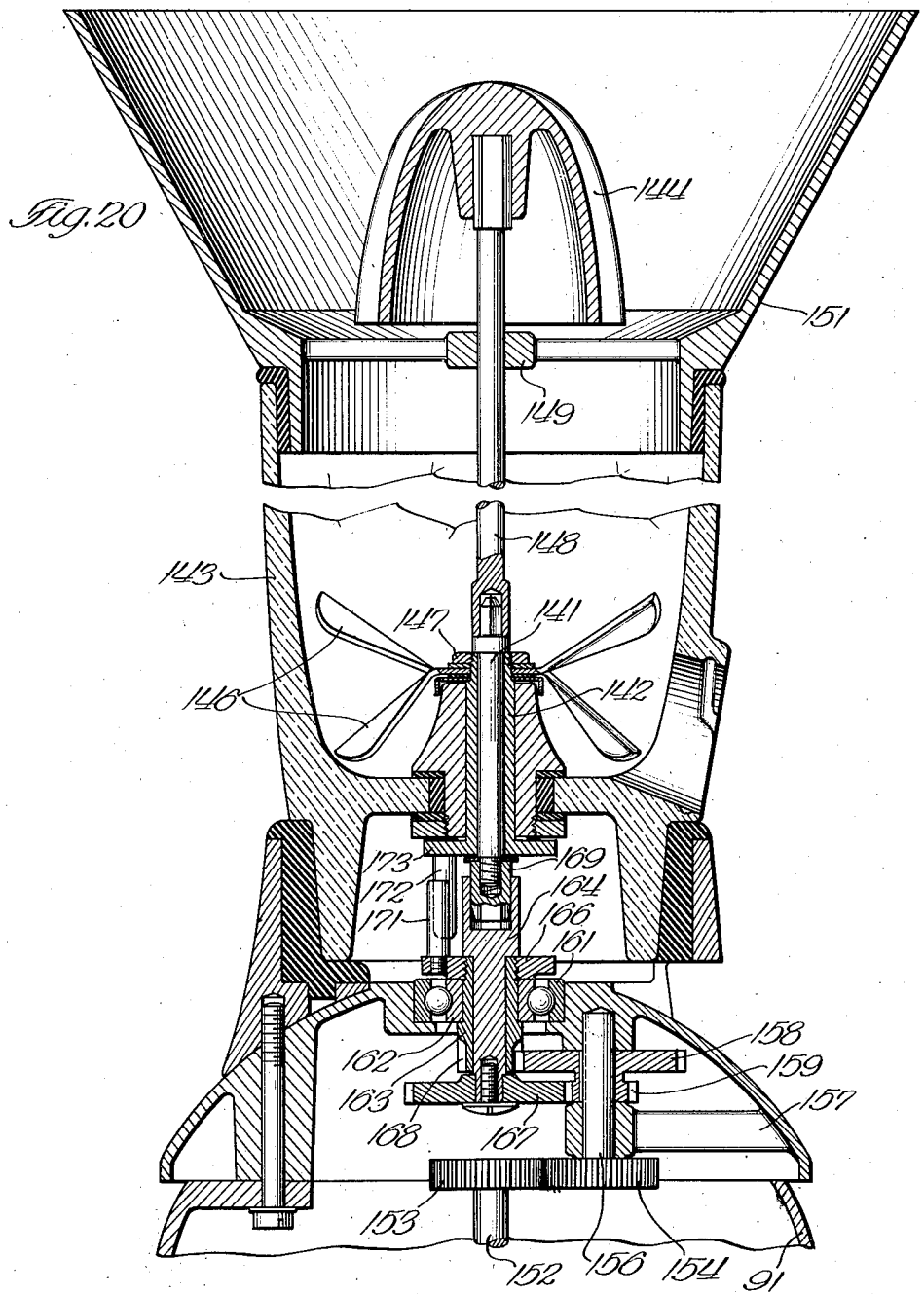
INVENTOR.
Benjamin E. Lawrence
BY
McLaughlin & Wallenstein
ATTORNEYS

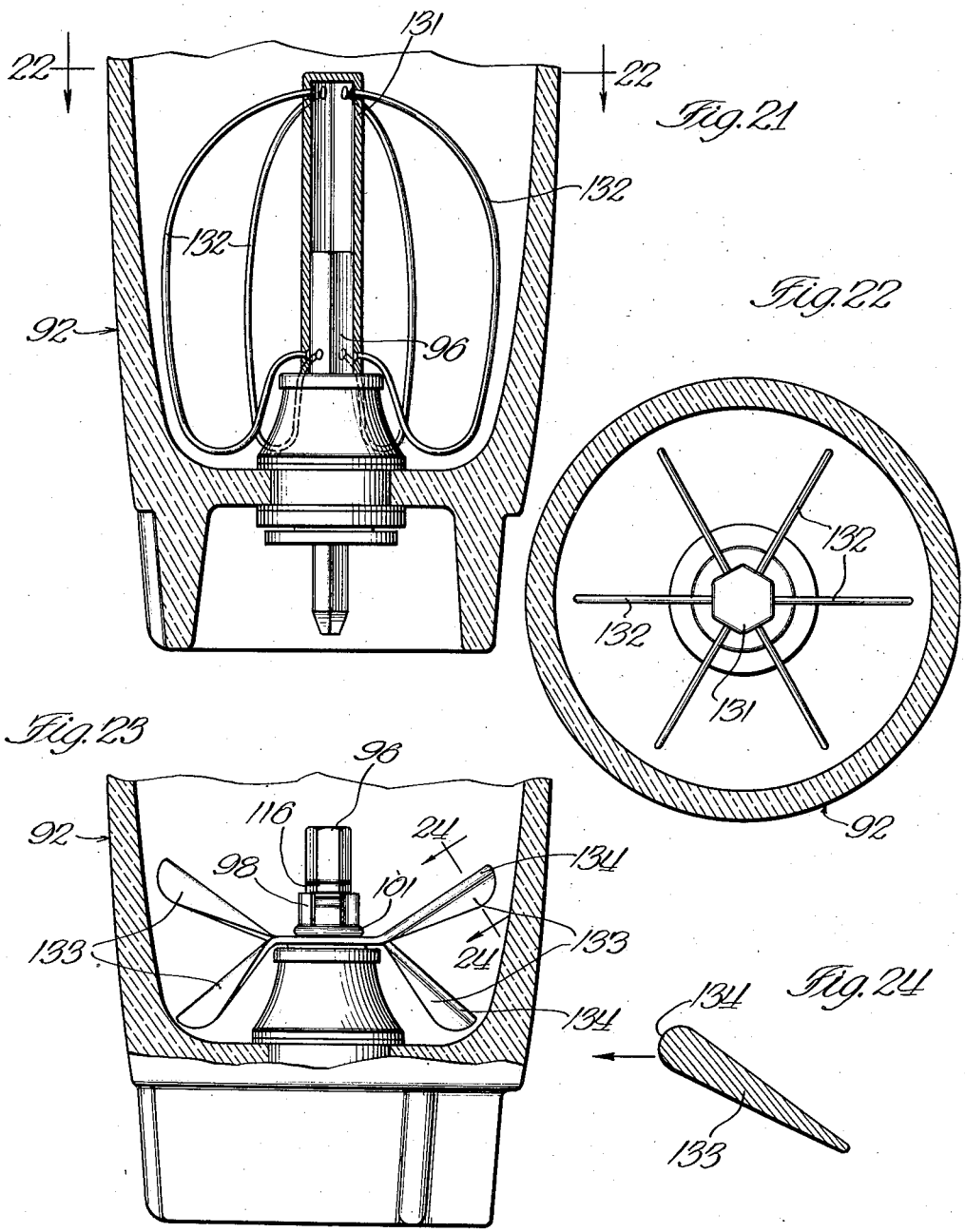

Patented Mar. 30, 1943

2,315,018

UNITED STATES PATENT OFFICE 2,315,018

JUICE EXTRACTOR AND MIXER

Benjamin E. Lawrence, Chicago, Ill.

Application December 28, 1939, Serial No. 311,385

10 Claims. (Cl. 146—3)

My invention relates to the extraction of juices from fruits, vegetables, and the like.

The vogue of extracting juices from fruits, vegetables and the like has resulted in the production of equipment of various types. The types of devices employed for the extraction of juices from citrous fruits are well known. I have found, however, that the proportion of clear juice extracted is by no means as complete as it reasonably could be with common types of juicers available to the industry. Another form of device which is employed for the extraction of juices from vegetables and the like makes use of a rapidly rotating drum member similar in general principle to centrifugal driers, this form of device serving to extract juice from vegetables which have been comminuted by suitable means, for example, by grating the vegetables against an irregular surface provided on the bottom of the rotating drum. This form of device is limited in its application and, because of the extremely fine balance which is required in the moving parts, is relatively expensive to build. In another form of device looking to obtaining the same general result, a cutting and mixing propeller is operated at relatively very high speed at or near the bottom of a bowl in such a way that vegetables and fruits may be reduced to pulp form. This form of device, however, does not extract the juice, it being necessary to pour the contents of the bowl into a strainer if the juice is to be extracted, and, for reasons which will appear obvious as the description progresses, fully desirable results in the use of this form of device as a juicer are not obtained.

It is an object of my present invention to utilize, in a single piece of equipment, substantially all of the desirable features found in the types of devices hereinabove referred to.

Another object is the provision of improved means for extracting the juices from fruits, vegetables, and the like.

In accordance with the general features of my invention, I utilize a relatively narrow bowl, at the bottom of which is placed a propeller adapted to be driven at a high rate of speed, so arranged in design as to comminute and mix materials such as vegetables, fruits, and the like, which are introduced into the bowl. The propeller may be readily removed for cleaning or for replacement by a propeller of modified design. Associated with the bowl or with a spout carried thereby, but at any rate near the bottom of the bowl, I provide an improved straining means, the positioning and construction of the strainer being such that the screen portion thereof is continuously cleaned through the movement of material in the bowl. The liquid portion of the material in the bowl is readily moved through the spout or similar outlet associated with the strainer. The spout may be removable from the bowl, if desired.

At the top of the bowl comprising a separate member or a portion of the bowl, I provide a juice extractor of a type utilizable in a conventional manner for the extraction of juice, pulpous and cellular material from citrous fruits. The juicer is driven preferably from the same source of power which drives the propeller, and it may be driven either at the same speed as the propeller or at a considerably reduced speed, as brought out in connection with the several embodiments illustrated in the drawings. The motor driving the propeller shaft may be provided with multiple speed control. By means of this construction, I am able to remove the entire fruit portion from within the outside peeling of a citrous fruit, deposit the juice, pulpous and cellular material into the bowl, and remove substantially all of the juice through the strainer, heretofore described, conveniently, expeditiously and more completely than with equipment heretofore employed. I have found, for example, that I may obtain as much as 30% or more of clear juice from a given citrous fruit by means of my equipment than has been obtainable by the use of the conventional equipment employed in the prior art. Associated with the juicer, or in the motor housing, I may employ speed reducing means so that the propeller may be driven at high speed while the juicer is simultaneously driven at relatively low speed.

Other specific objects and features of my invention will be brought out in the following detailed description, taken with the accompanying drawings, wherein Fig. 1 is a view, partially in elevation and partially in vertical section, showing one form which the equipment of my invention may take;

Fig. 2 is an enlarged vertical fragmentary section taken through the bottom of the bowl;

Fig. 3 is a sectional view taken on the line 3—3 of Fig. 1, looking in the direction of the arrows, illustrating one way in which the strainer and discharge spout are associated with the bowl;

Fig. 4 is an enlarged fragmentary sectional view, with the parts in exploded relation, showing the manner in which the screen and spout are secured to the bowl;

Fig. 5 is a fragmentary vertical sectional view;

Fig. 6 is an enlarged vertical sectional view taken through the juicer and showing it in position at the top of the bowl;

Fig. 7 is a plan view of Fig. 6, with a portion of the device removed and other portions being shown in section for the purpose of illustrating the relation of the parts;

Fig. 8 is a fragmentary sectional view taken on the line 8—8 of Fig. 6, showing the manner in which the juicer head is secured on its shaft;

Fig. 11 is an elevational view, partly in section, showing a modification of the general arrangement employed in Fig. 1, wherein the propeller, juicer, drive shaft and spout are readily removable for cleaning;

Fig. 12 is an enlarged fragmentary vertical sectional view of the device as shown in Fig. 11;

Fig. 13 is a plan view of a shaft spacer and bearing carrying member of the type shown in vertical section in Fig. 12;

Fig. 14 is an irregular sectional view taken along the line 14—14 of Fig. 12 showing the spout in section and a portion of the associated mechanism in elevation;

Fig. 15 is a view, partly in section and partly in elevation, illustrating one manner in which the spout may be secured to the bowl, the view being along the line 15—15 of Fig. 12, looking in the direction of the arrows;

Figure 9:
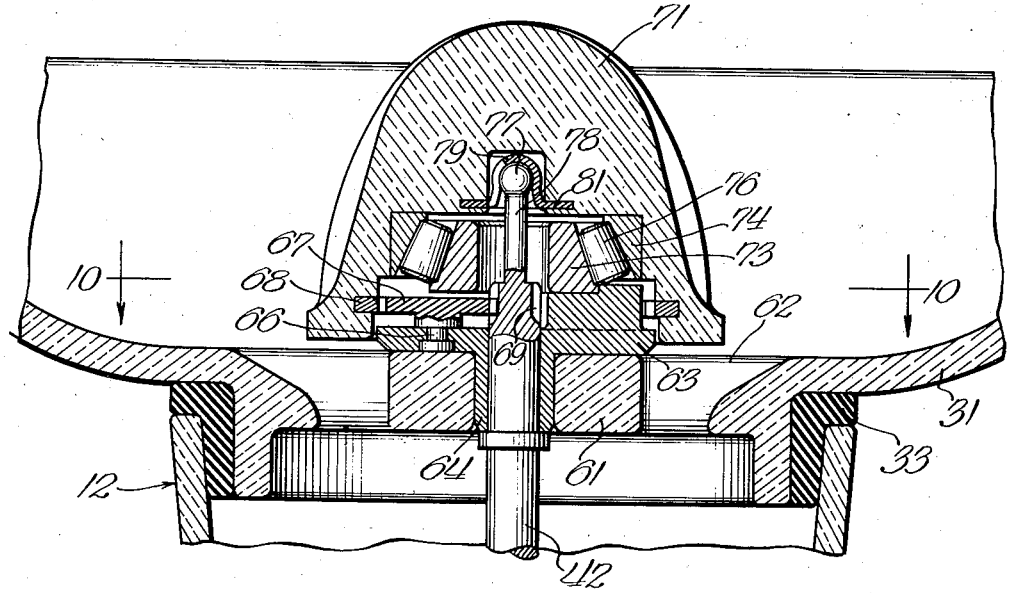
Fig. 9 is an enlarged fragmentary vertical sectional view, taken at the top of the bowl and through the juicer, showing a modification in which the juicer is driven at slower speed than the propeller of the bowl.
Figure 10:
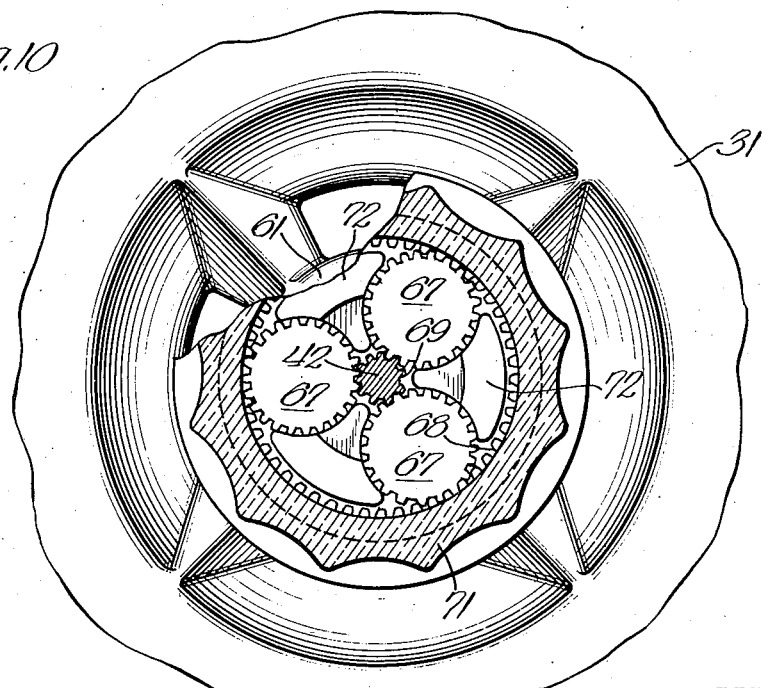
Fig. 10 is a plan sectional view taken on the line 10—10 of Fig. 9 looking in the direction of the arrows.

Figs. 16 and 17 are views through the propeller support, the views being partly in section and partly in elevation and taken along the lines 16—16 and 17—17, respectively, of Fig. 12;

Fig. 18 is an enlarged fragmentary elevational view of the propeller carrying shaft;

Fig. 19 is a side elevational view of the strainer, showing the spring clips employed to secure it to the spout;

Fig. 20 is a fragmentary vertical sectional view, showing an embodiment generally similar in principle to the form shown in Figs. 9 and 10, except that the gear reducing means for the juicer are housed in the motor casing;

Fig. 21 is a fragmentary vertical sectional view showing an agitating and whipping member which may be mounted on the shaft in place of the comminuting propeller shown in previous views;

Fig. 22 is a plan section taken on the line 22—22 of Fig. 21;

Fig. 23 is a fragmentary sectional view, partly in elevation, showing a modified form of propeller such as may be employed solely for the purpose of mixing and mashing where comminuting is not required; and Fig. 24 is a sectional view taken on the line 24—24 of Fig. 23, the arrow showing the direction of movement of the blade.

Referring now first to Fig. 1, I show a form of equipment in which a lower member 11, comprising essentially a stand and motor housing, releasably supports a bowl assembly 12. My invention is concerned primarily with the bowl portion and drive for the propeller and juicer, although I prefer to employ a construction and design for the lower member 11 wherein a motor (not shown) is provided with control means 13 permitting driving the motor at a plurality of speeds depending upon the particular operation which is being performed. At least five speeds should be provided, but preferably at least fifteen. Variable speed is obtained preferably by shifting the pole pieces, or by any other suitable means well known in the art.

The bowl 12 carries near its bottom a propeller 14 adapted to be driven at a high rate of speed through a shaft on which the propeller is mounted. At the lower portion of this shaft, there is a socket 16 engaging around a non-circular portion 17 of a motor driven shaft suitably journaled in the lower member 11. So far as my invention is concerned, the particular manner of making this connection is of no significance, it being advisable, however, to provide for the removal of the bowl assembly for cleaning and other purposes. It will be noted that the bottom of the bowl is shaped to engage a support portion of the lower member 11 so that, when the bowl assembly is placed in position, it is held firmly and a drive connection is formed to the propeller 14. The upper portion of the shaft driving the propeller 14 is kept tight by any suitable non-circular member such as a hexagonal nut 18.

The bowl proper of the bowl assembly may be formed of any suitable material, the drawings indicating the use of a glass bowl. At the lower portion thereof, I provide an opening in which is inserted a screen 19 having substantially the same curvature as the associated portion of the inside of the bowl and being substantially flush therewith. At the opening provided at the bottom of the bowl, a shoulder portion is formed against which a washer or gasket 21 engages, this washer or gasket serving to seal the joint where the screen or strainer 19 engages in the opening, and also to hold it in proper relation to the inside wall of the bowl. Engaging around the outside of the screen or strainer 19 and forming a part thereof is an annular snap fastening member 22 which snaps over a formed portion of the side wall of the bowl and engages with sufficient friction to hold the screen in place during the operation of the device, but which will permit removal of the screen whenever necessary so that screens of various meshes may be provided and used interchangeably. It will be noted that the opening in which the screen or strainer 19 is inserted has a somewhat different shape when viewed in transverse section, as in Fig. 3, and in vertical section, as shown in Fig. 2. This particular construction is utilized in part to hold the screen with adequate firmness, but still to permit its easy removal by tilting up at one portion of the edge thereof. The screen should be supported in a position where all of the liquid, clear down to the bottom inside surface of the bowl, may be drained through the screen.

A spout 23 is associated with the strainer, this spout having an annular beaded portion 24 so shaped as to spring into the opening provided in the bowl wall and within the member 22 forming a part of the strainer. This serves to hold the spout in position and also to assist in holding the strainer in position. The manner in which structurally this is accomplished is clear from a consideration of Figs. 2, 3 and 4 without detailed reference, it being understood, however, that I may use modified constructions for the purpose of securing the same result, depending to some extent upon the material from which the bowl proper is formed. The spout 23 is provided with a valve 26 turned by a thumb nut 27. Any suitable form of valve may be used so that the spout may be closed off entirely when it is not desired to remove liquids therethrough or may be opened at will to remove the liquid when desired.

I have referred to the fact that the screen 19, which comprises the strainer, may be removed, and that screens of different meshes may be utilized. Where it is desired to remove the screen without touching the spout, I may use a construction such as shown in Fig. 5. In this form of construction, the screen 19' is mounted at the lower end of a spring supporting member 28 shaped to engage over the top of the bowl, as shown, and having a spring action in such a direction as to hold the screen 19' in position, as shown. A plurality of such screens may be utilized and may be made interchangeable at the will of the user.

The juice extractor associated with the bowl assembly comprises a tray or disk-like member 31 having a depending annular flange 32 adapted to fit within the top of the bowl and provided with an annular rubber member 33 which engages over the top edge of the bowl and around the inside of the bowl so as to cushion the juicer on the bowl and assist in holding it frictionally in position. The rubber member 33 however is provided with projections 34 which engage on opposite sides of baffles 36 provided on the inside of the bowl. It will be recognized that this is merely an illustrative structure, all that is necessary being to provide such a support for the juicer that it will be supported substantially rigidly on the bowl and preferably so that it may be readily removed or replaced. When the bowl is made non-circular at the top, that portion of the tray 31 which engages the bowl is, of course, made to fit the bowl.

The tray portion 31 of the juice extractor may be formed of any suitable material, and, in the drawings, I shade this portion to indicate glass, a material which I found may be used suitably for the purpose. Near the center of the juicer, I provide a bearing member 37 connected to the tray portion 31 which comprises the main body by radially extending integral supporting ribs 38. These ribs are shaped to provide for adequate strength, as illustrated in Fig. 7, and are crowned along their center line in the manner shown so that any materials removed from a citrous fruit or the like will be discharged through openings 39 into the bowl rather than be caught on the ribs 38.

Within the bearing member 37, a sleeve 41 is provided which serves as a bearing for a vertical shaft 42. The sleeve 41 has a lower flange portion 43 and, between this flange portion and the bearing member 37, I provide a metal washer 44 and a rubber gasket 46, the former to act as a wearing surface against the flange 43 and the latter to act as a cushion between the glass bearing member 37 and the associated metal parts of the sleeve 41. At the top, the sleeve 41 is provided with threads for receiving a nut 47, and a metal washer 48 and rubber gasket 49 are provided between the nut 47 and the top portion of the glass bearing member 37. In other words, the same general structure is used at top and bottom of the glass bearing member 37 to prevent shocks, strains and vibrations resulting from the use of the device being transmitted to the glass portion in such a way as to break it. The shaft 42 is provided with a ring 51 which bears against the bottom of the flange 43 acting as a thrust member and to establish the relation of the parts as determined by the design. The shaft 42 is provided with means at the bottom for engagement of the shaft driving the propeller 14. A suitable connection, when a nut such as 18 (see Fig. 1) is secured to the top of this shaft, is to utilize a socket 52 at the bottom of the shaft 42 for engagement of the nut 18, whereby rotation of the propeller shaft will also cause rotation of the shaft 42.

At the top of the shaft 42, I provide a drive member 53 to act as an interconnection and driving member between the shaft and a juice extracting element 54. The member 53 is preferably flat, as shown, with a periphery defining a truncated isosceles triangle, at opposite sides of which are rounded projections 56. The upper part of the shaft is split to receive the member 53 and so constructed that the projections 56 engage in corresponding recesses at the top of the shaft in the split portion thereof. The member 53 is permanently inserted in the casting which comprises the juice extracting element 54. This member, therefore, is readily removable from the shaft by lifting it up, and is readily again associated with the shaft by engaging it in position with the member 53 in the split portion formed at the top of the shaft.

In the embodiment of Figs. 9 and 10, I provide means associated with the juice extractor for decreasing the speed of rotation of the juice extracting element 54 as compared to the speed of rotation of the propeller 14. The general outline of the tray portion 31 and its attachment to the top of the bowl may be the same as described in connection with Figs. 6 and 7. Those parts which are identical in the two designs are, therefore, given the same reference characters in order to simplify and shorten the description.

A central bearing member 61 is provided integral with ribs 62 forming a part of the main body with the tray 31. A bearing support member 63 has a sleeve 64 which is disposed between the glass bearing member 61 and the shaft 42. Employing, in the design shown, a planetary system of reducing gears, the member 63 journals shafts 66 carrying gears 67 corresponding to sun gears in transmission systems, and, disposed between a ring gear 68 and a driving gear 69, formed integral with the shaft 42. The ring gear 68 is, of course, a ring member and, as shown, it is imbedded in the casting comprising a juice extracting element 71. The drive is from shaft 42, through gear 69, through planet gears 67, and to the ring gear 68, a reduction taking place in the speed between each set of gears and the amount of reduction depending upon the particular design.

The member 63 has integral portions 72 projecting upwardly between the gears 67 and engaging and supporting an inner race 73 of a roller bearing, the outer race of which is an annular member 74 engaging the inside of the juice extracting element 71. Rollers 76 are provided between the two races, and a design is employed where the bearing, comprising the two recesses and the rollers, functions as both a radial and thrust bearing. As a further support and to position the juice extracting element 71, I provide a ball 77 on a relatively narrow upper shaft extension 78, this ball engaging into and being frictionally held in a socket formed by a member 79, an annular flange 81 of which is supported in the casting which comprises the juice extracting element 71. When the juice extracting element is removed from its position for cleaning and the like, the member 79 is separated from the ball 77. The combination radial and thrust bearing will also be removed, although, for simplicity of illustration, I have not illustrated the means employed for holding the combination thrust and radial bearing as a single unit. Those skilled in the art are referred to constructions employed in bearings of this type. I may point out, however, that the combination radial and thrust bearing may be so mounted as to remain in position when the juice extracting element 71 is removed for cleaning or the like.

Figs. 11 to 19, inclusive, show a mixing, comminuting and juicing device similar to that shown in Fig. 1 but wherein some of the detailed features are modified to secure certain advantages. This form utilizes a base 91 with a bowl assembly 92, the bowl being provided with a shoulder, as at 93 in Fig. 12, to form a firmer support on the base than is obtained by the use of the lugs alone. A shaft 94, journaled through the bottom of the bowl, connects with the motor drive shaft when the bowl is placed in position, and this shaft has secured to its upper projecting end a specially designed hexagonal nut 96 (see Fig. 18). The propeller 97 is carried on a hexagonal sleeve 98, this sleeve having a spring clip portion which engages in that portion of the groove 99 with which it happens to coincide when the propeller assembly is forced down over the member 96. It will be seen that the sleeve 98, being out of round, and the propeller opening corresponding in shape therewith, the propeller will turn with the sleeve, the sleeve, of course, being turned or rotated with the specially designed hexagonal nut 96. A deformed annulus 101 prevents the propeller from moving upwardly with respect to the sleeve 98, and a lower downwardly turned flared portion of the sleeve, forming a shoulder, anchors the propeller at the bottom position. Thus, while the propeller is firmly held in position during operation, it is readily removed for cleaning or for replacement.

In this form of the invention, a juicer may also be secured to the top of the bowl. This juicer comprises a dish portion 102 shaped to fit into the upper portion of the bowl, a rubber insert 103 being employed and serving the same general purpose as the rubber member 33 shown in the first described embodiment. A bearing 104 is carried by a centering ring 106, radial rods 107 having their inner ends threaded in the bearing 104 and their outer ends loosely supported in edge openings 108 of the ring 106. The construction, as clearly shown in Figs. 12 and 13, permits adjustment of the bearing 104 in a horizontal plane. The ring 106 is provided with projections 109 which engage in suitable recesses (not shown) in the dish portion 102, and prevent the ring from turning. The shaft 111 carries at its top a juice extracting element 112. The shaft is journaled in the bearing 104, and at its lower end, through a shell-like attaching member 113, it is releasably secured to the member 96 carried on the shaft 94. The member 113 has a clip-like portion 114 which engages in that portion of an annular recess 116 in the member 96 with which it happens to coincide when the sleeve-like coupling member 114 is forced down over the member 96.

A spout 117 is secured in a bottom side opening in the bowl and carries at its inner end a strainer 118. This strainer is provided with side spring clips, as shown in Fig. 19, which engage in a continuous recess on the outside surface of the spout 117 to hold the screen or strainer in position. While the spout may be formed as a part of the bowl, I show it in a preferred form, namely, removable. As will be seen by looking at Fig. 15, the bowl has threads which extend about a quarter turn and which are adapted to receive lugs 121 forming a part of the spout. This is a conventional type of "quick-opening" thread which permits the spout to be attached by inserting it when turned approximately ninety degrees in a counter-clockwise direction from its normal position, and then giving it approximately a quarter turn to fasten it firmly in position. The general shape of the threads 119, showing the generally bayonet-like slot arrangement, is apparent from the dotted lines shown in Fig. 12.

The spout 117 may be closed in any suitable manner. Preferably, I employ closure means effective at the strainer so that during a mixing operation none of the liquid can enter the spout. In the form shown, a yoke member 122 has its parallel arranged ends forced together by a screw 123 which clamps the yoke member about the outside surface of the spout. A suitably pivoted bell crank member 124 carries a stopper 126 at its lower end, this stopper being formed suitably of cork or like substance. A grasshopper spring 127 has one end engaging against the bell crank 124 and the other against a portion of the yoke member 122 which, as shown, acts as a frame or support for the associated apparatus. It will be noted that a slot 128 is formed in the upper portion of the spout so that a simple structure is made possible, while still accomplishing the object of stopping the spout at the screen and also extending it a sufficient distance so that contents of the bowl discharged at the spout are easily discharged into an ordinary glass 129.

The provision of a removable propeller in a device embodying the other features shown has considerable advantage not only from the standpoint of cleaning but also in making possible the design of equipment which is extremely versatile in the operations which it performs. When the device is used for different types of operations or for mixing or comminuting different types of materials, there is frequently some advantage in changing the shape, pitch or other structural features of the propeller. I may readily accomplish this with my design. Initially, I wish to point out that the propeller structure shown in Fig. 12 is readily formed as a part of the structure associated with the shaft 111, so that, if the shaft 111 and its associated parts are removed, the propeller 97 will be removed also. This is a suitable arrangement if a particular propeller is to be used only on citrous fruits, the juice of which is extracted by the extracting member 112.

In Fig. 21, I show a modified type of mixing member which may replace the propeller, this mixing member, indicated generally by the reference character 131, being of the whipper type such as is employed for mashing potatoes or pulping other materials which by previous treatment have been rendered soft, so that they are readily mashed to form a pulp. This member 131 has a central support fitting down over the member 96, and the wire whip members 132, which may be disposed in any suitable manner, for example, as shown in Fig. 22.

In Fig. 23, I show a modified form of propeller 133 in which the leading edge 134, as shown in Fig. 24, is blunt rather than sharp. When a comminuting action is desired, as, for example, when raw carrots are introduced into the bowl, it is essential that the leading edges be sharp to have a definite cutting action. For other operations, this cutting action is not only not necessary, but it may impair the efficacy of the propeller. The propeller shown in Fig. 23, therefore, is illustrative of the manner in which changes may be made. I may point out, however, that I have employed a propeller substantially identical with that shown in Fig. 23 with considerable advantage in the production of "mashed potatoes" wherein boiled potatoes, butter, condiments, and the like, are whipped together.

With the form of device shown in Fig. 20, speed reducing gearing is employed to drive the juice extracting element at a relatively slow rate of speed while the propeller is being driven at its normal or a relatively high rate of speed. This same general principle is employed in Figs. 9 and 10, the design shown in Fig. 20 differing in that speed reducing mechanism is housed within the lower housing member 91.

In accordance with this form, a shaft 141 and a sleeve 142 extend through the bottom of the bowl 143, the former adapted to drive the juicer 144 at a relatively low rate of speed and the latter adapted to drive the propeller 146 at a relatively high rate of speed. The propeller is shown secured in position against a shoulder on the sleeve 142 by a nut 147, but it will be understood that fastening means may be employed which renders the propeller readily removable. The juicer is driven by a shaft 148 which engages a non-circular upper projection on the shaft 141. The shaft 146 is journaled at 149, the journal means being carried by a dish member 151 which may be generally similar to the structure of previously described members of this character.

The sleeve 142 and the shaft 141 are driven at high and low speeds respectively, and I provide gear mechanism and clutch means for connecting each of these members to the drive mechanism such that connections are established by the mere act of placing the bowl assembly in position.

A regular motor shaft 152 carries a pinion 153 meshing with a pinion 154 carried on shaft 156 journaled in a boss provided on an arm 157 projecting from a portion of the housing. The upper end of shaft 156 is also journaled in a boss formed on the under side of the housing. Shaft 156 carries a gear assembly which comprises a relatively large gear 158 and a relatively smaller gear 159. This gear combination forms a sleeve-like structure which may be keyed, as shown, to the shaft 156, and side surfaces of the gears may be depended upon to furnish such thrust bearing means as is required.

Disposed within a formed portion of the housing is outer race 161 of a ball bearing, the inner race 162 of which ball bearing bears against the outer surface of a sleeve 163. The sleeve 163 journals a shaft 164 and the disk-like drive member 166 is screwed to the sleeve and engages against the top of the inner race 162 of the ball bearing, the inner race lying between the disk-like drive member 166 and a shoulder on the sleeve. The shaft 164 carries a gear 167 meshing with the small gear 159, and the sleeve carries a gear 168 meshing with the larger gear 158. The top portion of the shaft 164 is finished to provide a non-circular socket into which a non-circular plug 169 carried on shaft 141 projects as an incident to setting the bowl assembly in position. The disk-like drive member 166 carries an upwardly extending projection 171 which engages a downwardly extending projection 172 carried off-center on a lower flange-like projection 173 on the sleeve 142. I find that suitable results are obtained with only a single pair of projections 171 and 172 so far as the drive is concerned, although a plurality of such driving pins may be employed. There is an advantage in having a relatively small number in that there is less possibility of their abutting in end to end relationship and preventing setting the bowl in position.

The manner of assembling the parts of the device shown in Fig. 20 should be clear to the ordinary skilled mechanic, it being understood, of course, that some details of construction, such as the manner of holding the balls of the ball bearing in position, the specific shape of thrust means, materials used, and the like, may be changed in accordance with usual mechanical practices to suit particular conditions.

In the operation of the device, the shaft 152, being driven by the motor, drives the shaft 156 through the two gears 153 and 154. The drive to the propeller is through gears 158 and 168, sleeve 163, the disk-like drive member 166, and pins 171, 172, and thence to the sleeve 142 which carries the propeller. The drive for the shaft 141 is from shaft 156 through gears 159 and 167, and thence directly through the clutch arrangement shown. It will be noted that there is an over-drive from the motor shaft 152 to the propeller 146. This is merely illustrative, as the gear train may be selected so as to produce direct drive. It may be pointed out that, in general, a direct drive may be preferred, because, with the relatively small motors usually employed in equipment of this kind, substantial armature speed is necessary to obtain suitable drive action. I would suggest employing over-drive, therefore, only in those cases where extremely high speed may be desired for the propeller, that is, speeds greater than now usually employed.

Certain details of construction which are not of prime significance so far as my present invention is concerned have not been brought out for obvious reasons. The manner of constructing the motor, the manner of providing for multiple speeds thereof, the identical construction of the propeller 14 and bowl in which it rotates are all features known in the art. Also, so far as the juice extracting elements are concerned, the outer construction employed on these members is well known, a common provision being to provide a series of raised portions or ribs such as I illustrate in the drawings. I may point out also that, in the form shown in Figs. 1 to 8, inclusive, the juice extracting element does not extend over the openings provided at the center of the tray 31, but, in the form shown in Fig. 9, these openings are covered by the juice extracting element so that any splashing of the contents within the bowl will not cause any portion of the contents to be ejected at the top. In the forms shown in Figs. 12 and 20, the openings in the top are exposed, but the upstanding sides of the dished portion will return such spray as may be projected upwardly. The reason for the arrangement shown in the several embodiments will be clearer from the description of the operation.

Considering now first the form shown in Figs. 1 to 8, inclusive, the manner of operation is as follows: I shall consider first the use of the equipment to remove juices from citrous fruits. The motor first is run at low speed with the juicer in position at the top of the bowl, and a number of oranges, lemons, grape fruit or the like are treated to remove the juice, pulp and cellular material, that is the contents down to the peel. When a sufficient amount of material has been collected in the bowl, the juicer portion, with the shaft 42, is removed, and the switch is turned to operate the motor at high speed. By allowing the propeller to operate for a few seconds, all of the solid material in the bowl is broken up into very fine particles, cells are ruptured which may contain juice, and all of the juice is freed from the associated solid or pulpy material. The valve 26 is then opened, the motor still being permitted to operate at high speed, and the juice flows through the strainer, clear and with all of the solid or pulpy material removed. I find that the strainer does not clog, the movement of the contents of the bowl serving to continuously clean the strainer and present a new portion of the liquid to the screen for straining. The device is allowed to operate until the contents of the bowl are dry and substantially all of the juice has been removed. I find that, by actual measurement, I obtain from 25% to 35% more juice in this manner than can be obtained by means of juice extracting equipment now utilized either in the home or in commercial establishments.

If the juice from vegetables or pulpy fruits, such as apples, is to be extracted, the portion of the device which I have referred to as a juicer is not utilized. Running the motor at high speed, the material from which the juice is to be extracted is introduced into the bowl and the motor allowed to run for a short time until all of the pulpy and cellular material of the vegetable or fruit is broken up and the juices freed therefrom. The valve is then opened while the motor continues to run, and the clear vegetable or fruit juice is discharged, the strainer or screen remaining clean as pointed out in connection with the description of the operation on citrous fruits. The results obtained with vegetables and fruits may be compared to the practice which has been employed heretofore in which vegetables were comminuted and a product of the consistency of a heavy cream formed. When people attempted to drink such a material with the pulpous material unseparated from the juice, only very few found the product palatable under all circumstances. Furthermore, when straining was attempted, it was necessary to remove the contents of the bowl a little at a time for introduction into a strainer so that some of the solid or pulpy material would tend to settle or clog in a ball-like mass. There was a tendency for this to drop out in the form of a large gob or mass onto the strainer unless extreme care was employed. Furthermore, in the straining operation, using an ordinary hand strainer, it was necessary to continuously scrape the solid material away which collected against the strainer and clogged it, sufficiently to bring about a free flow of juice therethrough.

The form of the device shown in Figs. 9 and 10 is particularly advantageous for the purpose of extracting the juice from citrous fruits. By means of this form of the invention, the juice extracting element 71 may be run at a low speed while the propeller in the bowl is operated at high speed. The result is that I may continuously operate the device to discharge the fruity portion of the citrous fruit into the bowl and the juice will substantially simultaneously flow from the spout. When a planetary gear system is employed and no load is placed upon the driven member, it is well known that the driven member tends to rotate at the speed of the driving member. To overcome this, I may provide a light load, as by friction, on the juice extracting element 71, although I find that this is unnecessary because, as soon as the citrous fruit engages the juice extracting element, it slows down to its true speed as determined by the gear ratios employed. I may, of course, employ other forms of gearing, but I find that certain advantages in balance result from the use of planetary gearing, and nicely balanced moving parts are advantageous in a device of the kind illustrated.

The general manner of employing the device shown in Figs. 11 to 19, inclusive, is the same as that described in connection with Figs. 1 to 8, inclusive. It being kept in mind that preferably I employ a motor having multiple speeds, for example, as much as fifteen speeds or more, the juicer 112 will be operated at a relatively low speed, but a speed having a relation to the operation being performed. When the juice and pulp has been deposited in the bowl, the motor is operated at high speed, the exact speed depending upon the character of the material in the bowl. When operation has been continued for a short time, the stopper is removed by contact with the screen by compressing the upper end of the arm 124, moving the parts to the dotted line position of Fig. 12, the motor being allowed to run during this period. The juice is delivered through the spout to the glass 129 or other receptacle.

When the device has been operated on oranges, for example, and it is desired to cream butter and sugar together, or perform some similar operation, the juice extracting portion may be removed, the spout removed, and the propeller assembly removed. The latter two parts may, if desired, be thoroughly cleaned and replaced. I have found that it is extremely difficult to avoid imparting a taste to one batch of material from a previously treated batch of different material unless the parts can be removed and thoroughly cleaned outside of the bowl. Oranges, for example, will impart a flavor to cream, butter, certain types of vegetables, and the like, if they are mixed or comminuted in the bowl after the juice has been extracted from the oranges.

Instead of replacing the same propeller, a different propeller, selected to have a somewhat different operation, may be placed in position very readily. Moreover, a different screen may be employed or a blank without holes may be used in place of the screen, if for some reason or other it is not desired to employ the screen and spout in the intended manner. As an illustration of an operation which may be suitably performed with my device but which cannot be performed in any suitable manner with previous devices, I wish to mention the production of the dish usually called mashed potatoes which, in general, consists of potatoes mashed and beaten up with butter, a small amount of cream and condiments.

Using the propeller shown in Fig. 23, potatoes are introduced with the butter and cream, and a relatively wide mesh screen is placed in position at the spout. After a relatively short period of mixing, the stopper may be removed from the screen and a creamy potato mixture is discharged through the screen, the materials being in very finely divided form and thoroughly mixed and creamed. If there are any relatively large pieces of potato in the bowl at the time the stopper is opened, these pieces will not pass the screen but will be retained in the bowl until they have been thoroughly broken up and are fine enough to pass through the screen.

For different operations, the propellers may be changed and the screens changed in the general manner described in the illustrative example. The blades may be selected in accordance with the food or drink material in the bowl and an outside advantage results from this fact coupled with the fact that a speed may also be selected consistent with the operation being performed. As a general example, it may be pointed out that a sharp blade rotated at very high speed is very suitable for liquefying such materials as raw carrots, raw potatoes, celery, tomatoes, and similar vegetables. A relatively blunter blade, with a modified pitch, rotated at somewhat lower speed, is much more suitable for creaming and like operations. In connection with the removal of the blade, it may be pointed out also that there is little likelihood of cutting the fingers on the sharp blades during cleaning such as results when the blades are held permanently in position. Moreover, the propeller blade edges are easily resharpened when the propeller is out of the bowl.

The manner of operating the device of Fig. 20 is believed clear from preceding references to the operation generally. I wish to point out that, for the purpose of simplifying the showing, a screen and a spout have not been shown in Fig. 20, but they are readily applied in the opening provided for the purpose as shown in the drawing. This form has the advantage, as previously noted, of permitting a juice extracting operation being performed at the same time that the propeller is being rotated to break up the pulpy material and increase the proportion of juice obtained.

I show the upper portion of the equipment as readily removable from the bowl, a construction which I prefer for many reasons, particularly because it imparts greater versatility to the equipment as a whole. Although it is understood that the parts may be formed substantially integrally where desired.

The screen employed should be selected in accordance with the material, the juice of which is being extracted. Because of the construction employed, screens are readily and simply changed where change is indicated. So far as the materials employed are concerned, it is understood that considerable variation may exist. I have shown all of the parts with which the fruit or vegetables come in contact as formed of glass, except the propeller, drive shafts, screens and discharge spout. The latter parts may be formed of corrosion resisting material, such as stainless steel, or materials normally not resistant to corrosion but treated at the surface to make them corrosion resistant, as, for example, by plating them with chromium or similar material. The parts shown of glass may, of course, be made of any suitable material, such as stainless steel, and, when so made, it is understood that the construction may be somewhat less massive and adequate strength still obtained. Certain problems result when glass is used substantially throughout, and I illustrate structures which overcome these problems.

I wish to point out that the mixing and comminuting device forming a part of my invention is not to be confused with the conventional mixer found at most soda fountains. The propeller substantially fills the bottom portion of the bowl, has a plurality of blades, the leading edges of the blades are sharpened, and the speed of rotation is at least several thousand revolutions per minute, preferably above fifteen thousand revolutions per minute, and better still of the order of twenty thousand revolutions per minute or more. During the time when the vegetables are first introduced into the bowl, there will, of course, be some decrease in the speed because of the added load, but, when the products have been comminuted, substantially the maximum speed is attained, and it appears to me that the vortices resulting from this exceedingly high speed is responsible for keeping the strainer or screen unclogged. It is not a question merely of centrifugal force against the screen, otherwise solid or pulpy material as well as juice would be moved outwardly by centrifugal force and clogging would necessarily result.

What I claim as new and desire to protect by Letters Patent of the United States is:

1. In equipment of the character described, a bowl, a propeller supported near the bottom of the bowl and shaped to cut and comminute pulpy and like material when rotating at high speed, means for driving said propeller, and a screen disposed in an opening near the bottom of said bowl substantially flush with the inside side wall surface thereof, the construction and arrangement being such that liquid may be separated from pulpy material of fruits and vegetables and be discharged through said screen while said propeller is being driven at high speed, the movement of material within the bowl serving to prevent clogging of the screen.

2. The combination defined in claim 1, including a spout and shut-off valve associated with said screen opening, whereby material may be thoroughly mixed and comminuted within the bowl, and liquid portions thereof then removed by opening the shut-off valve while continuing to operate the propeller in the bowl.

3. In equipment of the character described, a bowl, a propeller supported near the bottom of the bowl and shaped to cut and comminute pulpy and like material when rotating at high speed, means for driving said propeller, a juice extracting assembly including an element for removing the fruit portion of citrous fruits, means for attaching said assembly to the top of said bowl, means forming a connection between the said propeller drive means and said element, said assembly arranged to discharge fruit portions removed by said element into said bowl, and a screen disposed in an opening at the bottom of said bowl, whereby the entire fruit portion of a citrous fruit may be deposited in said bowl, comminuted by said propeller, and the juice discharged through said screen, the proportion of juice obtained being relatively great because of the composite action of said propeller and said screen.

4. In equipment of the character described, a bowl having a top edge, sides and bottom, a drive shaft extending through said bottom, a propeller mounted near said bottom on said drive shaft, a support for said bowl, a motor carried by said support and adapted to drive said shaft at a high rate of speed, a tray member secured to the top edge of said bowl and carrying a bearing, a shaft journaled in said bearing having its lower end engaged to be driven by said propeller shaft, and a juice extracting element for citrous fruits carried at the top of said last mentioned shaft and disposed within the periphery of said tray, said tray apertured to direct fruit material extracted by said element into the said bowl for further comminution by said propeller.

5. Equipment as defined in claim 4, including speed reducing gearing in the drive train between said propeller shaft and said juice extracting element, whereby said element may be operated at low speed while the propeller is operated at high speed.

6. In equipment of the character described, a bowl having a top edge, sides and bottom, a drive shaft extending through said bottom, a propeller mounted near said bottom on said drive shaft, a support for said bowl, a motor carried by said support and adapted to drive said shaft at a high rate of speed, a tray member secured to the top edge of said bowl and carrying a bearing, a shaft journaled in said bearing having its lower end engaged to be driven by said propeller shaft, a juice extracting element for citrous fruits carried at the top of said last-mentioned shaft and disposed within the periphery of said tray, said tray apertured to direct fruit material extracted by said element into the said bowl for further comminution by said propeller, and a screen disposed in an opening provided near the bottom of said bowl for the discharge of liquid material, the composite action of said propeller and screen serving to cause a relatively large proportion of juice to be removed from citrous fruits and preventing the clogging of said screen.

7. Equipment as defined in claim 6, including speed reducing gearing between said propeller shaft and said juice extracting element, whereby said element may be operated at low speed while the propeller is operated at high speed to continuously further comminute and remove the juice from fruit material deposited in the bowl by operation of said extracting element.

8. In equipment of the character described, a fruit juice extractor adapted for use with a comminuting device, including a bowl having a propeller at the bottom thereof, including a tray member shaped to be supported on a top edge of said bowl, said tray having a central bearing member, a juice extracting element rotatably supported above said tray member, and a shaft journaled in said bearing member carrying said juice extracting element at the top thereof, and having its bottom shaped to engage the propeller in the bowl whereby to drive said juice extracting element.

9. A juice extractor as defined in claim 8, including speed reducing gearing between said shaft and said juice extracting element whereby to drive the same at a reduced speed as compared with the said propeller.

10. In equipment of the character described, a bowl having a top edge, sides and bottom, a first drive shaft extending through said bottom, a relatively long member secured to the top of said first drive shaft having a non-circular cross section, propeller means adapted to be engaged around said member, friction means for holding said propeller means in position, said friction means operating to hold the propeller rigidly in operating position but to permit ready removal of the propeller, a juice extracting element adapted for mounting at the top of the bowl, and a second drive shaft for operating said juice extracting element, said second drive shaft being provided with a lower shell-like socket engaging said member which is engaged by the propeller means, whereby the juicer may readily be associated with the bowl in driving relation with said first drive shaft.

BENJAMIN E. LAWRENCE.